(12) United States Patent
Elluru et al.

(10) Patent No.: US 12,182,136 B2
(45) Date of Patent: Dec. 31, 2024

(54) GLOBAL CONFIDENCE CLASSIFIER FOR INFORMATION RETRIEVAL IN CONTACT CENTERS

(71) Applicant: Genesys Cloud Services, Inc., Menlo Park, CA (US)

(72) Inventors: Veera Raghavendra Elluru, Hyderabad (IN); Ramasubramanian Sundaram, Hyderabad (IN); Basil George, Hyderabad (IN); Naresh Kumar Elluru, Hyderabad (IN); Pavan Kumar Buduguppa, Hyderabad (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 17/564,783

(22) Filed: Dec. 29, 2021

(65) Prior Publication Data
US 2023/0205774 A1    Jun. 29, 2023

(51) Int. Cl.
*G06F 16/2457* (2019.01)
*G06F 16/93* (2019.01)
*G06N 20/00* (2019.01)

(52) U.S. Cl.
CPC ........ *G06F 16/24578* (2019.01); *G06F 16/93* (2019.01); *G06N 20/00* (2019.01)

(58) Field of Classification Search
CPC .... G06F 16/24578; G06F 16/93; G06N 20/00
USPC ........................................................ 707/728
See application file for complete search history.

(56) References Cited

U.S. PATENT DOCUMENTS

| | | | |
|---|---|---|---|
| 2017/0242899 A1* | 8/2017 | Jolley | G06F 16/242 |
| 2017/0243107 A1* | 8/2017 | Jolley | G06N 5/02 |
| 2019/0042988 A1 | 2/2019 | Brown et al. | |
| 2020/0380963 A1 | 12/2020 | Chappidi et al. | |
| 2021/0089942 A1 | 3/2021 | Bigaj et al. | |
| 2021/0157312 A1* | 5/2021 | Cella | G01M 13/045 |
| 2021/0173916 A1* | 6/2021 | Ortiz | H04L 9/3213 |
| 2021/0272040 A1* | 9/2021 | Johnson | G06N 5/022 |

OTHER PUBLICATIONS

International Search Report and Written Opinion of the International Searching Authority; ISA/US; International Application No. PCT/US2022/054294; Apr. 12, 2023; 8 pages.

* cited by examiner

*Primary Examiner* — Hosain T Alam
*Assistant Examiner* — Saba Ahmed
(74) *Attorney, Agent, or Firm* — Taft Stettinius & Hollister LLP

(57) ABSTRACT

A method of leveraging a global confidence classifier for information retrieval in contact centers according to an embodiment includes receiving, by a computing system, a user query from a contact center client communication with a knowledge-only bot of the computing system, performing, by the computing system, feature extraction on the user query by converting query words of the user query into a numerical vector representation of the user query, identifying, by the computing system, a subset of documents most likely to be responsive to the user query, and re-ranking, by the computing system, the subset of documents most likely to be responsive to the user query based on a global confidence classifier model.

18 Claims, 8 Drawing Sheets

FIG. 5

| Approach | Language | KB_ID | Duration (in sec.) | | | Test Queries | Accuracy | | |
|---|---|---|---|---|---|---|---|---|---|
| | | | Trad. Approach | Global classifier | % impr. | | Trad. Approach | Global Classifier | % impr. |
| Including Alternatives and Categories | English | A_alt_10 | 2.521 | 1.38 | 82.6 | 10 | 100 | 100 | 0 |
| | | A_alt_20 | 2.718 | 1.822 | 49.18 | 20 | 100 | 100 | 0 |
| | | A_alt_50 | 5.705 | 4.031 | 41.55 | 50 | 96 | 98 | 2.08 |
| | | A_alt_80 | 7.324 | 5.441 | 34.61 | 80 | 95 | 95 | 0 |
| | | A_alt_100 | 9.144 | 6.789 | 34.69 | 100 | 91 | 91 | 0 |
| | | A_alt_full | 67.897 | 52.84 | 28.5 | 579 | 73.06 | 72.54 | -0.71 |
| | German | B_alt_10 | 1.598 | 1.249 | 27.9 | 17 | 94.12 | 94.12 | 0 |
| | | B_alt_20 | 1.905 | 1.522 | 25.12 | 36 | 94.44 | 94.44 | 0 |
| | | B_alt_50 | 3.993 | 3.223 | 23.87 | 96 | 89.58 | 91.67 | 2.33 |
| | | B_alt_80 | 6.332 | 4.459 | 41.99 | 152 | 88.16 | 89.47 | 1.49 |
| | | B_alt_100 | 9.036 | 5.555 | 62.68 | 189 | 88.89 | 89.95 | 1.19 |
| | | B_alt_full | 24.913 | 15.87 | 56.95 | 496 | 87.9 | 87.5 | -0.46 |
| Only Categories | English | A_no_alt_10 | 1.882 | 1.239 | 51.86 | 10 | 90 | 100 | 11.11 |
| | | A_no_alt_20 | 2.433 | 1.718 | 41.66 | 20 | 95 | 100 | 5.26 |
| | | A_no_alt_50 | 5.149 | 3.609 | 42.67 | 50 | 94 | 96 | 2.13 |
| | | A_no_alt_80 | 6.991 | 5.524 | 26.57 | 80 | 93.75 | 95 | 1.33 |
| | | A_no_alt_100 | 9.199 | 6.416 | 43.39 | 100 | 91 | 92 | 1.1 |
| | | A_no_alt_full | 59.56 | 47.04 | 26.61 | 579 | 65.63 | 70.98 | 8.15 |
| | German | B_no_alt_10 | 1.361 | 0.955 | 42.44 | 17 | 82.35 | 82.35 | 0 |
| | | B_no_alt_20 | 1.547 | 1.209 | 28 | 36 | 88.89 | 88.89 | 0 |
| | | B_no_alt_50 | 3.268 | 2.468 | 32.43 | 96 | 77.08 | 78.12 | 1.35 |
| | | B_no_alt_80 | 5.272 | 3.638 | 44.91 | 152 | 76.32 | 79.61 | 4.31 |
| | | B_no_alt_100 | 7.302 | 4.309 | 69.45 | 189 | 75.13 | 78.84 | 4.94 |
| | | B_no_alt_full | 19.929 | 11.58 | 70.54 | 496 | 72.78 | 76.61 | 5.26 |

FIG. 7

| Approach | Language | KB_ID | Duration (in sec.) | | % Impr. | Test Queries | Accuracy | | % Impr. |
|---|---|---|---|---|---|---|---|---|---|
| | | | Trad. Approach | Global classifier | | | Trad. Approach | Global Classifier | |
| Only Alternatives | English | A_no_cat_10 | 2.205 | 1.223 | 80.26 | 10 | 100 | 100 | 0 |
| | | A_no_cat_20 | 3.745 | 1.87 | 100.2 | 20 | 100 | 100 | 0 |
| | | A_no_cat_50 | 7.643 | 4.023 | 89.97 | 50 | 96 | 98 | 2.08 |
| | | A_no_cat_80 | 12.265 | 5.757 | 113 | 80 | 93.75 | 96.25 | 2.67 |
| | | A_no_cat_100 | 15.267 | 7.597 | 100.9 | 100 | 92 | 91 | -1.09 |
| | | A_no_cat_full | 91.424 | 52.89 | 72.85 | 579 | 71.5 | 72.37 | 1.22 |
| | German | B_no_cat_10 | 1.969 | 1.03 | 91.22 | 17 | 94.12 | 94.12 | 0 |
| | | B_no_cat_20 | 2.557 | 1.192 | 114.5 | 36 | 94.44 | 94.44 | 0 |
| | | B_no_cat_50 | 6.272 | 2.724 | 130.2 | 96 | 91.67 | 91.67 | 0 |
| | | B_no_cat_80 | 9.976 | 4.178 | 138.8 | 152 | 88.82 | 88.82 | 0 |
| | | B_no_cat_100 | 12.183 | 5.076 | 139.9 | 189 | 88.89 | 89.95 | 1.19 |
| | | B_no_cat_full | 30.478 | 15.4 | 97.9 | 496 | 86.9 | 87.5 | 0.69 |
| No Alternatives and No Categories | English | A_no_alt_nc_10 | 1.939 | 1.145 | 69.36 | 10 | 90 | 100 | 11.11 |
| | | A_no_alt_nc_20 | 2.637 | 1.68 | 56.98 | 20 | 95 | 100 | 5.26 |
| | | A_no_alt_nc_50 | 5.474 | 3.861 | 41.8 | 50 | 96 | 98 | 2.08 |
| | | A_no_alt_nc_80 | 8.569 | 5.276 | 62.43 | 80 | 93.75 | 95 | 1.33 |
| | | A_no_alt_nc_100 | 11.06 | 6.717 | 64.66 | 100 | 91 | 92 | 1.1 |
| | | A_no_alt_nc_full | 65.776 | 45.69 | 43.96 | 579 | 65.98 | 71.68 | 8.64 |
| | German | B_no_alt_nc_10 | 1.386 | 0.942 | 47.14 | 17 | 82.35 | 82.35 | 0 |
| | | B_no_alt_nc_20 | 1.793 | 1.145 | 56.66 | 36 | 88.89 | 88.89 | 0 |
| | | B_no_alt_nc_50 | 3.946 | 2.597 | 51.94 | 96 | 77.08 | 79.17 | 2.71 |
| | | B_no_alt_nc_80 | 5.651 | 3.644 | 55.09 | 152 | 76.32 | 80.26 | 5.16 |
| | | B_no_alt_nc_100 | 6.649 | 4.305 | 54.44 | 189 | 75.13 | 79.89 | 6.34 |
| | | B_no_alt_nc_full | 18.087 | 11.77 | 53.68 | 496 | 72.38 | 76.01 | 5.02 |

FIG. 8

GLOBAL CONFIDENCE CLASSIFIER FOR INFORMATION RETRIEVAL IN CONTACT CENTERS

BACKGROUND

Chatbots have become ubiquitous tools for businesses and contact centers to deliver improved customer experiences and responsiveness to their clients. Given the rise of deep learning techniques, improved hardware, and artificial intelligence platforms, the development of chatbots has proliferated. There are multiple styles of chatbots including knowledge-only bots, self-service bots, and hybrid bots. Knowledge-only bots rely on knowledge bases, which may be created using organization FAQs, product documents, user manuals, and/or other relevant documentation. Self-service bots are dynamic in that they understand the user intent and collect required information from the user to provide a suitable answer based on the available resources. Hybrid bots combine the approaches of both knowledge-only bots and self-service bots.

SUMMARY

One embodiment is directed to a unique system, components, and methods for leveraging a global confidence classifier for information retrieval in contact centers. Other embodiments are directed to apparatuses, systems, devices, hardware, methods, and combinations thereof for leveraging a global confidence classifier for information retrieval in contact centers.

According to an embodiment, a method of leveraging a global confidence classifier for information retrieval in contact centers may include receiving, by a computing system, a user query from a contact center client communication with a knowledge-only bot of the computing system, performing, by the computing system, feature extraction on the user query by converting query words of the user query into a numerical vector representation of the user query, identifying, by the computing system, a subset of documents most likely to be responsive to the user query, and re-ranking, by the computing system, the subset of documents most likely to be responsive to the user query based on a global confidence classifier model.

In some embodiments, the method may further include providing, by the computing system, a response to the contact center client based on the re-ranked subset of documents via the knowledge-only bot in response to re-ranking the subset of documents most likely to be responsive to the user query.

In some embodiments, the global confidence classifier model may be trained based on document sets for a plurality of organizations.

In some embodiments, the global confidence classifier model may be trained based on document sets in a plurality of human languages.

In some embodiments, the global confidence classifier model may be trained based on a confidence classifier that uses at least five input features.

In some embodiments, the at least five input features may include a first alignment score between the user query and a corresponding document, a second alignment score between the corresponding document and the user query, a cosine similarity score between the user query and the corresponding document, a document score from a document classifier, and a word overlap score that calculates a number of n-grams that are similar between the user query and the corresponding document.

In some embodiments, the global confidence classifier model may be trained based on a confidence classifier that has a plurality of classes.

In some embodiments, the global confidence classifier model may be a machine learning model.

In some embodiments, performing the feature extraction on the user query may include performing the feature extraction on the user query using custom embeddings.

In some embodiments, the method may further include natural language processing, by the computing system, the user query to generate processed data, wherein the natural language processing comprises at least one of cleaning or segmenting data of the user query.

In some embodiments, performing the feature extraction on the user query may include performing feature extraction on the processed data.

In some embodiments, identifying the subset of documents most likely to be responsive to the user query may include identifying the subset of documents based on the processed data.

According to another embodiment, a system for leveraging a global confidence classifier for information retrieval in contact centers may include at least one processor and at least one memory comprising a plurality of instructions stored thereon that, in response to execution by the at least one processor, causes the system to receive a user query from a contact center client communicating with a knowledge-only bot of the system, perform feature extraction on the user query by converting query words of the user query into a numerical vector representation of the user query, identify a subset of documents most likely to be responsive to the user query, and re-rank the subset of documents most likely to be responsive to the user query based on the feature extraction and a global confidence classifier model.

In some embodiments, the plurality of instructions may further cause the system to provide a response to the contact center client based on the re-ranked subset of documents via the knowledge-only bot in response to re-ranking the subset of documents most likely to be responsive to the user query.

In some embodiments, the global confidence classifier model may be trained based on document sets for a plurality of organizations in a plurality of human languages.

In some embodiments, the global confidence classifier model may be trained based on a confidence classifier that uses at least five input features.

In some embodiments, the at least five input features may include a first alignment score between the user query and a corresponding document, a second alignment score between the corresponding document and the user query, a cosine similarity score between the user query and the corresponding document, a document score from a document classifier, and a word overlap score that calculates a number of n-grams that are similar between the user query and the corresponding document.

In some embodiments, the global confidence classifier model may be a machine learning model.

In some embodiments, to perform the feature extraction on the user query may include to perform the feature extraction on the user query using custom embeddings.

In some embodiments, the plurality of instructions may further cause the system to apply natural language processing to the user query to generate processed data, wherein the natural language processing comprises at least one of cleaning or segmenting data of the user query, wherein to perform the feature extraction on the user query may include perform feature extraction on the processed data, and wherein to identify the subset of documents most likely to be responsive to the user query may include to identify the subset of documents based on the processed data.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 7-8 are a table detailing statistics comparing a traditional classification approach to the global confidence classification approach of the subject disclosure.

DETAILED DESCRIPTION

Figure 1:
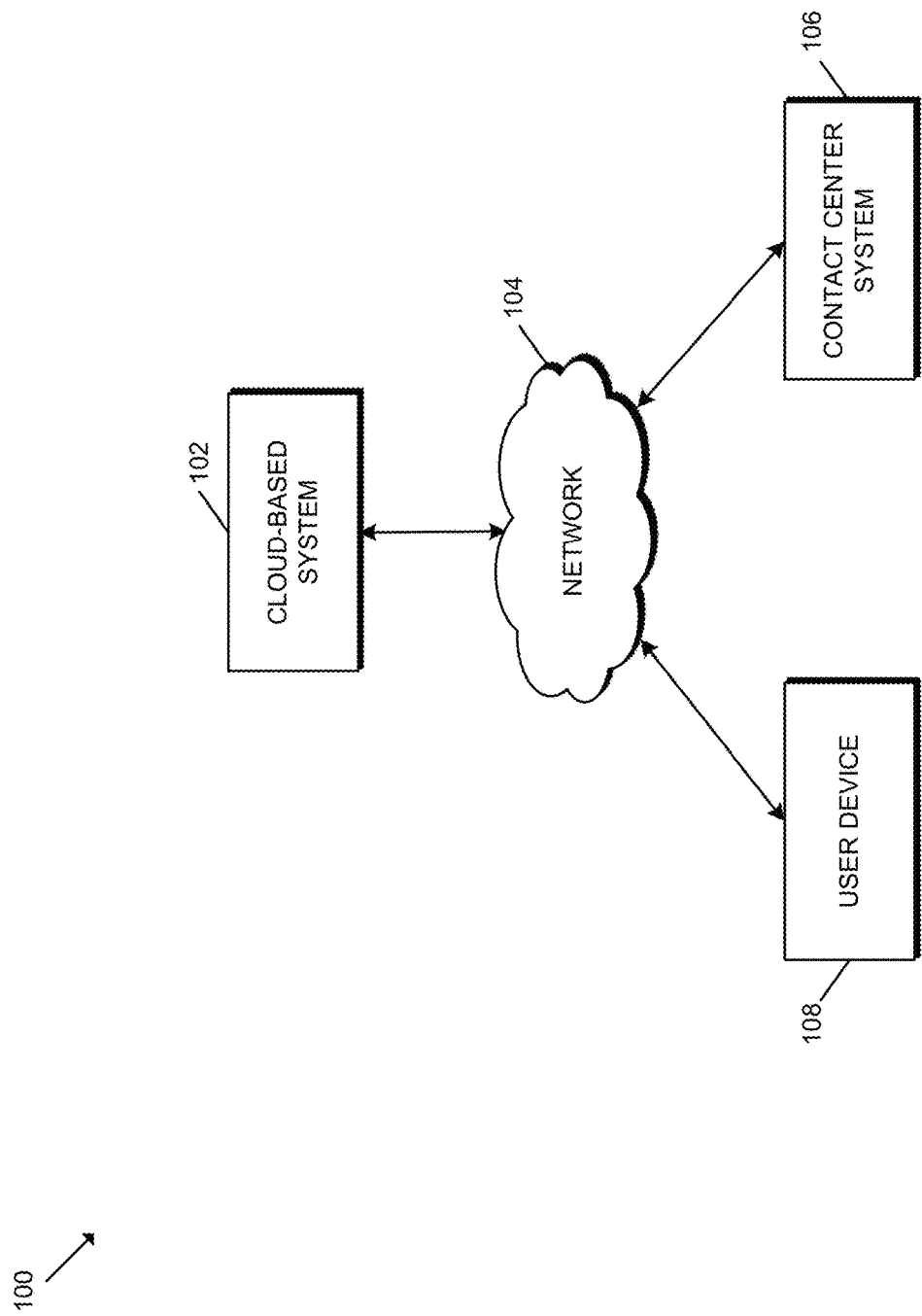
FIG. 1 is a simplified block diagram of at least one embodiment of a system for using and training a global confidence classifier for information retrieval in contact centers.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for leveraging a global confidence classifier for information retrieval in contact centers includes a cloud-based system 102, a network 104, a contact center system 106, and a user device 108. Although only one cloud-based system 102, one network 104, one contact center system 106, and one user device 108 are shown in the illustrative embodiment of FIG. 1, the system 100 may include multiple cloud-based systems 102, networks 104, contact center systems 106, and/or user devices 108 in other embodiments. For example, in some embodiments, multiple cloud-based systems 102 (e.g., related or unrelated systems) may be used to perform the various functions described herein. Further, in some embodiments, one or more of the systems described herein may be excluded from the system 100, one or more of the systems described as being independent may form a portion of another system, and/or one or more of the systems described as forming a portion of another system may be independent.

It should be appreciated that the technologies described herein may improve the confidence classification of knowledge-only bots. Classification challenges for such bots may stem from the simplicity of the corresponding frameworks, the poor performance of machine learning models due to a lack of data, the lack of information about documents (e.g., metadata), and/or other factors. The global confidence classification technologies described herein involve collecting data from various sources and using the same model for multiple bots, which provides higher accuracy and lower latency than traditional approaches (see, for example, the table of FIGS. 7-8). As described below, in the illustrative embodiment, the global confidence classifier trains a model to predict five-class probabilities based on five numeric input features. It should be appreciated that the global confidence classifier may be trained using multiple datasets using a greater number of documents, categories, and alternative phrases, for example, due to text such as words or bigrams not being directly used as a feature part. However, in other embodiments, it should be appreciated that the global confidence classifier may be otherwise structured.

It should be appreciated that each of the cloud-based system 102, network 104, contact center system 106, and/or user device 108 may be embodied as any type of device/system, collection of devices/systems, or portion(s) thereof suitable for performing the functions described herein.

The cloud-based system 102 may be embodied as any one or more types of devices/systems capable of performing the functions described herein. For example, in the illustrative embodiment, the cloud-based system 102 is configured to leverage the global confidence classifier for information retrieval in contact centers as described herein. In particular, the cloud-based system 102 may include one or more data stores or databases configured to store various documents, models, embeddings, classifiers, and/or other data relevant to the features described herein. Further, the cloud-based system 102 may be configured to perform natural language processing (NLP) of various documents (e.g., document cleaning, data segmentation, etc.), document classification (e.g., using machine learning), feature extraction (e.g., using custom word embeddings, general embeddings, etc.), confidence classification, document ranking/re-ranking, and/or perform other features related to the global confidence classification described herein.

Although the cloud-based system 102 is described herein in the singular, it should be appreciated that the cloud-based system 102 may be embodied as or include multiple servers/systems in some embodiments. Further, although the cloud-based system 102 is described herein as a cloud-based system, it should be appreciated that the system 102 may be embodied as one or more servers/systems residing outside of a cloud computing environment in other embodiments. In some embodiments, the cloud-based system 102 may be embodied as, or similar to, the cloud-based system 200 described in reference to FIG. 2.

In cloud-based embodiments, the cloud-based system 102 may be embodied as a server-ambiguous computing solution, for example, that executes a plurality of instructions on-demand, contains logic to execute instructions only when prompted by a particular activity/trigger, and does not consume computing resources when not in use. That is, system 102 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 102 described herein. For example, when an event occurs (e.g., data is transferred to the system 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system 102), the appropriate virtual function(s) may be executed to perform the actions before eliminating the instance of the virtual function(s).

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108 of the system 100. It should be appreciated that the various devices/systems 102, 106, 108 may communicate with one another via different networks 104 depending on the source and/or destination devices/systems 102, 106, 108.

In some embodiments, it should be appreciated that the cloud-based system 102 may be communicatively coupled to the contact center system 106, form a portion of the contact center system 106, and/or be otherwise used in conjunction with the contact center system 106. For example, the contact center system 106 may include a chat bot (e.g., similar to the chat bot 218 of FIG. 2) configured to communicate with a user (e.g., via the user device 108). Further, in some embodiments, the user device 108 may communicate directly with the cloud-based system 102.

The contact center system 106 may be embodied as any system capable of providing contact center services (e.g., call center services) to an end user (e.g., a contact center client) and otherwise performing the functions described herein. Depending on the particular embodiment, it should be appreciated that the contact center system 106 may be located on the premises/campus of the organization utilizing the contact center system 106 and/or located remotely relative to the organization (e.g., in a cloud-based computing environment). In some embodiments, a portion of the contact center system 106 may be located on the organization's premises/campus while other portions of the contact center system 106 are located remotely relative to the organization's premises/campus. As such, it should be appreciated that the contact center system 106 may be deployed in equipment dedicated to the organization or third-party service provider thereof and/or deployed in a remote computing environment such as, for example, a private or public cloud environment with infrastructure for supporting multiple contact centers for multiple enterprises. In some embodiments, the contact center system 106 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

The user device 108 may be embodied as any type of device capable of executing an application and otherwise performing the functions described herein. For example, in some embodiments, the user device 108 is configured to execute an application to participate in a conversation with a personal bot, automated agent, chat bot, or other automated system. As such, the user device 108 may have various input/output devices with which a user may interact to provide and receive audio, text, video, and/or other forms of data. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

It should be appreciated that each of the cloud-based system 102, the network 104, the contact center system 106, and/or the user device 108 may be embodied as (and/or include) one or more computing devices similar to the computing device 300 described below in reference to FIG. 3. For example, in the illustrative embodiment, each of the cloud-based system 102, the network 104, the contact center system 106, and/or the user device 108 may include a processing device 302 and a memory 306 having stored thereon operating logic 308 (e.g., a plurality of instructions) for execution by the processing device 302 for operation of the corresponding device.

Figure 2:
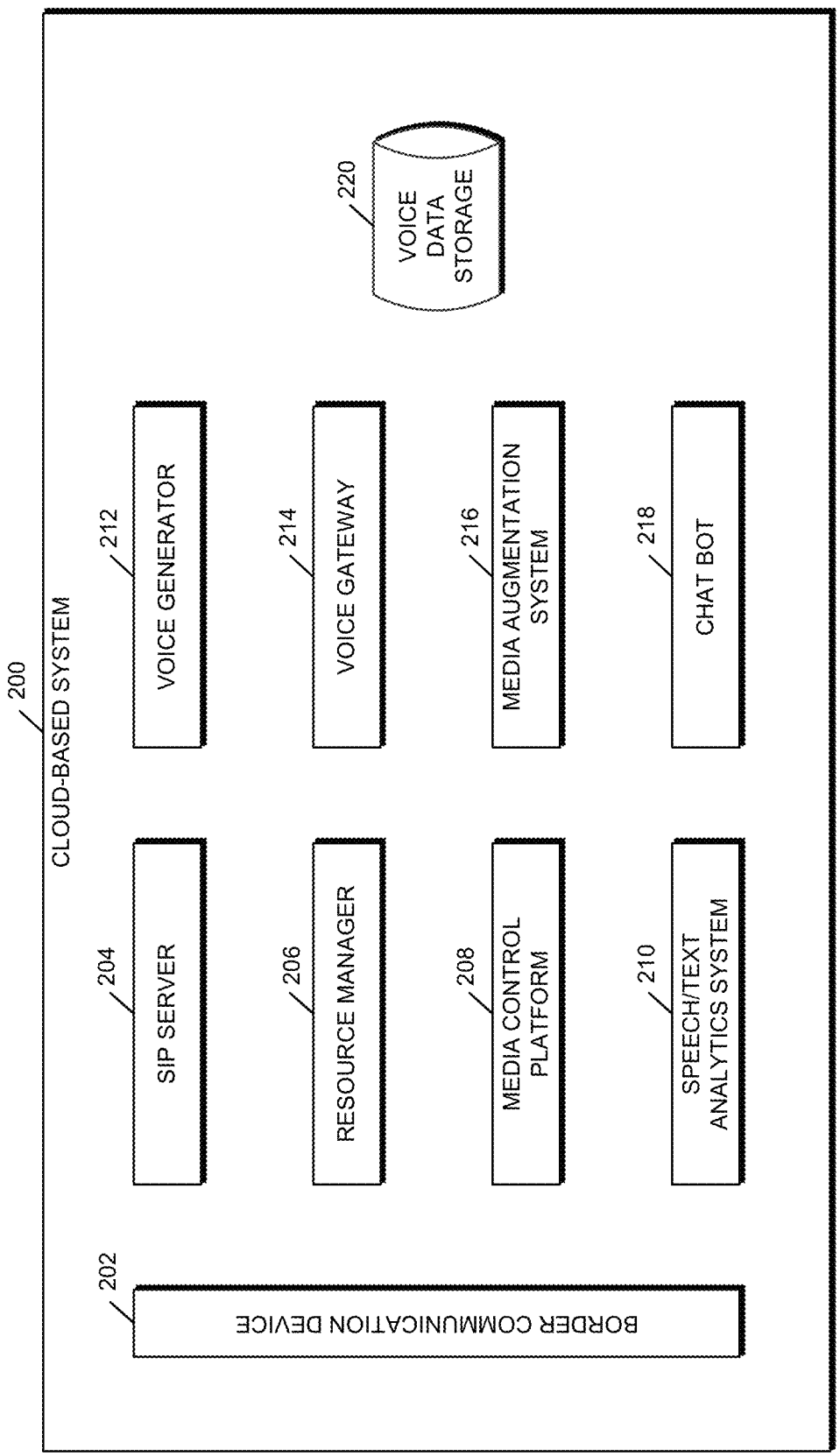
FIG. 2 is a simplified block diagram of at least one embodiment of a cloud-based system.

Referring now to FIG. 2, a simplified block diagram of at least one embodiment cloud-based system 200 is shown. The illustrative cloud-based system 200 includes a border communication device 202, a SIP server 204, a resource manager 206, a media control platform 208, a speech/text analytics system 210, a voice generator 212, a voice gateway 214, a media augmentation system 216, a chat bot 218, and voice data storage 220. Although only one border communication device 202, one SIP server 204, one resource manager 206, one media control platform 208, one speech/text analytics system 210, one voice generator 212, one voice gateway 214, one media augmentation system 216, one chat bot 218, and one voice data storage 220 are shown in the illustrative embodiment of FIG. 2, the cloud-based system 200 may include multiple border communication devices 202, SIP servers 204, resource managers 206, media control platforms 208, speech/text analytics systems 210, voice generators 212, voice gateways 214, media augmentation systems 216, chat bots 218, and/or voice data storages 220 in other embodiments. For example, in some embodiments, multiple chat bots 218 may be used to communicate regarding different subject matters handled by the same cloud-based system 200. Further, in some embodiments, one or more of the components described herein may be excluded from the system 200, one or more of the components described as being independent may form a portion of another component, and/or one or more of the component described as forming a portion of another component may be independent.

The border communication device 202 may be embodied as any one or more types of devices/systems that are capable of performing the functions described herein. For example, in some embodiments, the border communication device 202 may be configured to control signaling and media streams involved in setting up, conducting, and tearing down voice conversations and other media communications between, for example, an end user and contact center system. In some embodiments, the border communication device 202 may be a session border controller (SBC) controlling the signaling and media exchanged during a media session (also referred to as a "call," "telephony call," or "communication session") between the end user and contact center system. In some embodiments, the signaling exchanged during a media session may include SIP, H.323, Media Gateway Control Protocol (MGCP), and/or any other voice-over IP (VoIP) call signaling protocols. The media exchanged during a media session may include media streams that carry the call's audio, video, or other data along with information of call statistics and quality.

In some embodiments, the border communication device 202 may operate according to a standard SIP back-to-back user agent (B2BUA) configuration. In this regard, the border communication device 202 may be inserted in the signaling and media paths established between a calling and called parties in a VoIP call. In some embodiments, it should be understood that other intermediary software and/or hardware devices may be invoked in establishing the signaling and/or media paths between the calling and called parties.

In some embodiments, the border communication device 202 may exert control over the signaling (e.g., SIP messages) and media streams (e.g., RTP data) routed to and from an end user device (e.g., the user device 108) and a contact center system (e.g., the contact center system 106) that traverse the network (e.g., the network 104). In this regard, the border communication device 202 may be coupled to trunks that carry signals and media for calls to and from the user device over the network, and to trunks that carry signals and media to and from the contact center system over the network.

The SIP server 204 may be embodied as any one or more types of devices/systems that are capable of performing the functions described herein. For example, in some embodiments, the SIP server 204 may act as a SIP B2UBA and may control the flow of SIP requests and responses between SIP endpoints. Any other controller configured to set up and tear down VoIP communication sessions may be contemplated in addition to or in lieu of the SIP server 204 in other embodiments. The SIP server 204 may be a separate logical component or may be combined with the resource manager 206. In some embodiments, the SIP server 204 may be hosted at a contact center system (e.g., the contact center system 106). Although a SIP server 204 is used in the illustrative embodiment, another call server configured with another VoIP protocol may be used in addition to or in lieu of SIP, such as, for example, H.232 protocol, Media Gateway Control Protocol, Skype protocol, and/or other suitable technologies in other embodiments.

The resource manager 206 may be embodied as any one or more types of devices/systems that are capable of performing the functions described herein. In the illustrative embodiment, the resource manager 206 may be configured to allocate and monitor a pool of media control platforms for providing load balancing and high availability for each resource type. In some embodiments, the resource manager 206 may monitor and may select a media control platform 208 from a cluster of available platforms. The selection of the media control platform 208 may be dynamic, for example, based on identification of a location of a calling end user, type of media services to be rendered, detected quality of a current media service, and/or other factors.

In some embodiments, the resource manager 206 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

In some embodiments, the resource manager 206 may be configured to act as a SIP proxy, a SIP registrar, and/or a SIP notifier. In this regard, the resource manager 206 may act as a proxy for SIP traffic between two SIP components. As a SIP registrar, the resource manager 206 may accept registration of various resources via, for example, SIP REGISTER messages. In this manner, the cloud-based system 200 may support transparent relocation of call-processing components. In some embodiments, components such as the media control platform 208 do not register with the resource manager 206 at startup. The resource manager 206 may detect instances of the media control platform 208 through configuration information retrieved from the configuration database. If the media control platform 208 has been configured for monitoring, the resource manager 206 may monitor resource health by using, for example, SIP OPTIONS messages. In some embodiments, to determine whether the resources in the group are alive, the resource manager 206 may periodically send SIP OPTIONS messages to each media control platform 208 resource in the group. If the resource manager 206 receives an OK response, the resources are considered alive. It should be appreciated that the resource manager 206 may be configured to perform other various functions, which have been omitted for brevity of the description. The resource manager 206 and the media control platform 208 may collectively be referred to as a media controller.

In some embodiments, the resource manager 206 may act as a SIP notifier by accepting, for example, SIP SUBSCRIBE requests from the SIP server 204 and maintaining multiple independent subscriptions for the same or different SIP devices. The subscription notices are targeted for the tenants that are managed by the resource manager 206. In this role, the resource manager 206 may periodically generate SIP NOTIFY requests to subscribers (or tenants) about port usage and the number of available ports. The resource manager 206 may support multi-tenancy by sending notifications that contain the tenant name and the current status (in- or out-of-service) of the media control platform 208 that is associated with the tenant, as well as current capacity for the tenant.

The media control platform 208 may be embodied as any service or system capable of providing media services and otherwise performing the functions described herein. For example, in some embodiments, the media control platform 208 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g. VoiceXML applications) that are executed as part of the process of establishing a media session between the media control platform 208 and the end user.

The speech/text analytics system (STAS) 210 may be embodied as any service or system capable of providing various speech analytics and text processing functionalities (e.g., text-to-speech) as will be understood by a person of skill in the art and otherwise performing the functions described herein. The speech/text analytics system 210 may perform automatic speech and/or text recognition and grammar matching for end user communications sessions that are handled by the cloud-based system 200. The speech/text analytics system 210 may include one or more processors and instructions stored in machine-readable media that are executed by the processors to perform various operations. In some embodiments, the machine-readable media may include non-transitory storage media, such as hard disks and hardware memory systems.

The voice generator 212 may be embodied as any service or system capable of generating a voice communication and otherwise performing the functions described herein. In some embodiments, the voice generator 212 may generate the voice communication based on a particular voice signature.

The voice gateway 214 may be embodied as any service or system capable of performing the functions described herein. In the illustrative embodiment, the voice gateway 214 receives end user calls from or places calls to voice communications devices, such as an end user device, and responds to the calls in accordance with a voice program that corresponds to a communication routing configuration of the contact center system. In some embodiments, the voice program may include a voice avatar. The voice program may be accessed from local memory within the voice gateway 214 or from other storage media in the cloud-based system 200. In some embodiments, the voice gateway 214 may process voice programs that are script-based voice applications. The voice program, therefore, may be a script written in a scripting language, such as voice extensible markup language (VoiceXML) or speech application language tags (SALT). The cloud-based system 200 may also communicate with the voice data storage 220 to read and/or write user interaction data (e.g., state variables for a data communications session) in a shared memory space.

The media augmentation system 216 may be embodied as any service or system capable of specifying how the portions of the cloud-based system 200 (e.g., one or more of the border communications device 202, the SIP server 204, the resource manager 206, the media control platform 208, the speech/text analytics system 210, the voice generator 212, the voice gateway 214, the media augmentation system 216, the chat bot 218, the voice data storage 220, and/or one or more portions thereof) interact with each other and otherwise performing the functions described herein. In some embodiments, the media augmentation system 216 may be embodied as or include an application program interface (API). In some embodiments, the media augmentation system 216 enables integration of differing parameters and/or protocols that are used with various planned application and media types utilized within the cloud-based system 200.

The chat bot 218 may be embodied as any automated service or system capable of using automation to engage with end users and otherwise performing the functions described herein. For example, in some embodiments, the chat bot 218 may operate, for example, as an executable program that can be launched according to demand for the particular chat bot. In some embodiments, the chat bot 218 simulates and processes human conversation (either written or spoken), allowing humans to interact with digital devices as if the humans were communicating with another human. In some embodiments, the chat bot 218 may be as simple as rudimentary programs that answer a simple query with a single-line response, or as sophisticated as digital assistants that learn and evolve to deliver increasing levels of personalization as they gather and process information. In some embodiments, the chat bot 218 includes and/or leverages artificial intelligence, adaptive learning, bots, cognitive computing, and/or other automation technologies. Chat bot 218 may also be referred to herein as one or more chat robots, AI chat bots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to initially handle chat conversations without a human end user knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

As described herein, in illustrative embodiments, the chat bot 218 may be embodied as a knowledge-only bot that relies on knowledge bases created, for example, using organization FAQs, product documents, user manuals, and/or other relevant documentation.

The voice data storage 220 may be embodied as one or more databases, data structures, and/or data storage devices capable of storing data in the cloud-based system 200 or otherwise facilitating the storage of such data for the cloud-based system 200. For example, in some embodiments, the voice data storage 220 may include one or more cloud storage buckets. In other embodiments, it should be appreciated that the voice data storage 220 may, additionally or alternatively, include other types of voice data storage mechanisms that allow for dynamic scaling of the amount of data storage available to the cloud-based system 200. In some embodiments, the voice data storage 220 may store scripts (e.g., pre-programmed scripts or otherwise). Although the voice data storage 220 is described herein as data storages and databases, it should be appreciated that the voice data storage 220 may include both a database (or other type of organized collection of data and structures) and data storage for the actual storage of the underlying data. The voice data storage 220 may store various data useful for performing the functions described herein.

Figure 3:
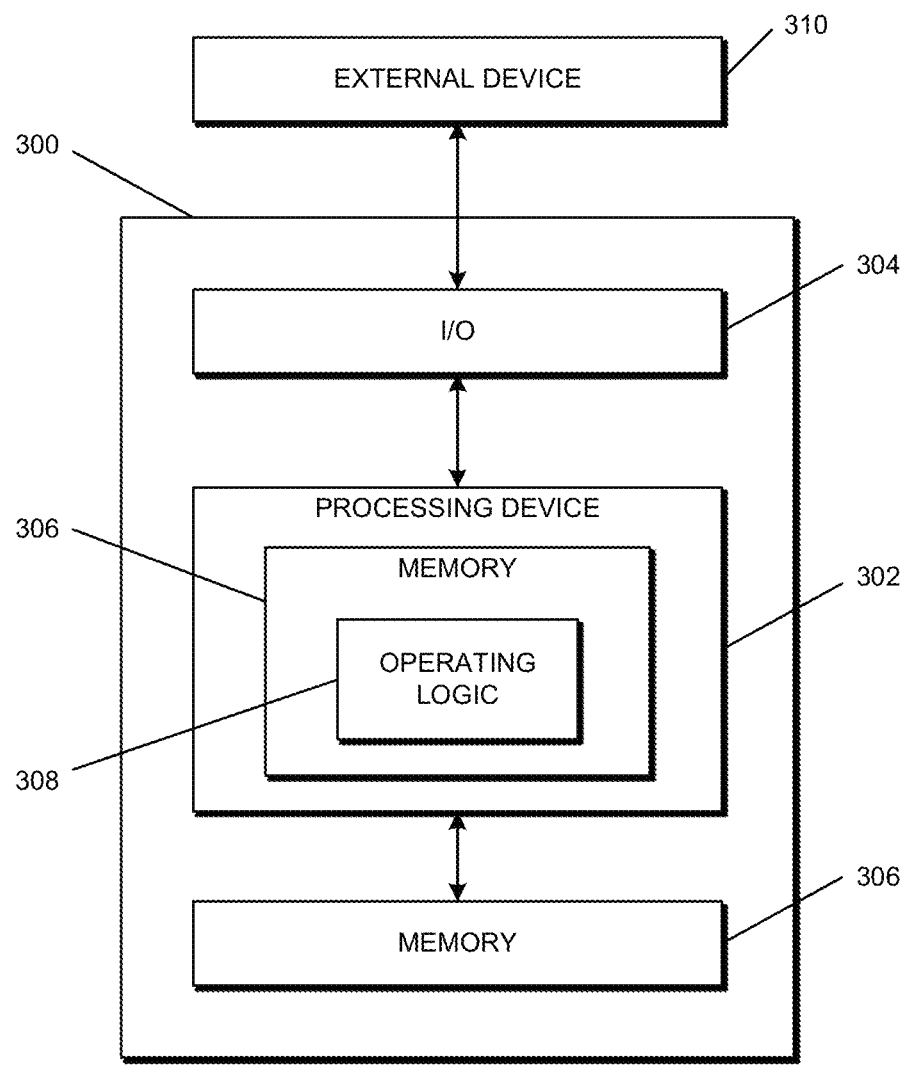
FIG. 3 is a simplified block diagram of at least one embodiment of a computing device.

Referring now to FIG. 3, a simplified block diagram of at least one embodiment of a computing device 300 is shown. The illustrative computing device 300 depicts at least one embodiment of a cloud-based system, contact center system, and/or user device that may be utilized in connection with the cloud-based system 102, the contact center system 106, and/or the user device 108 (and/or a portion thereof) illustrated in FIG. 1. Further, in some embodiments, one or more of the border communications device 202, the SIP server 204, the resource manager 206, the media control platform 208, the speech/text analytics system 210, the voice generator 212, the voice gateway 214, the media augmentation system 216, the chat bot 218, and/or the voice data storage 220 (and/or a portion thereof) may be embodied as or executed by a computing device similar to the computing device 300. Depending on the particular embodiment, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the cloud-based system 102, the contact center system 106, the user device 108, and/or a portion thereof. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
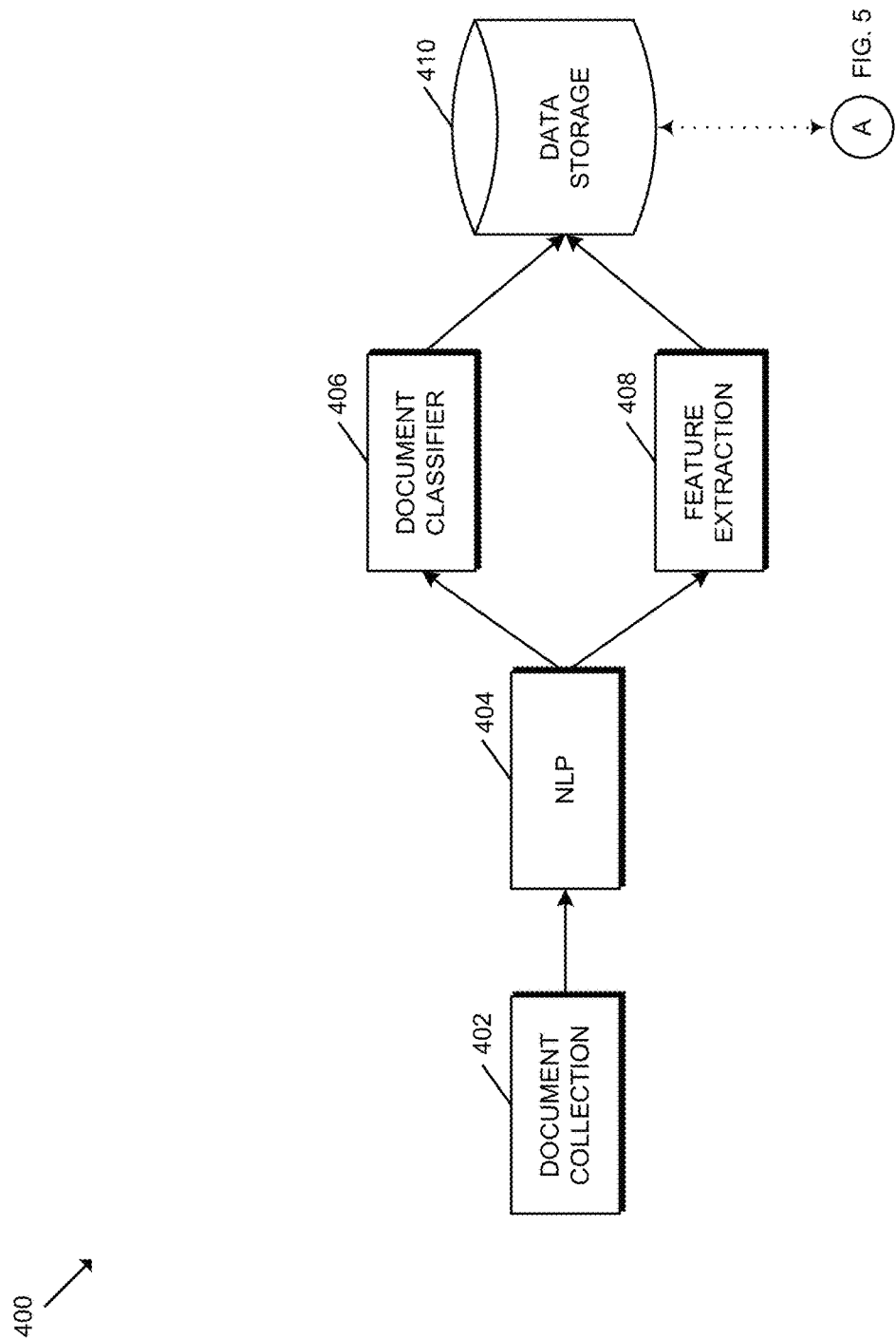
FIGS. 4-6 are a simplified block diagram of at least one embodiment of a system flow for leveraging a global confidence classifier for information retrieval in contact centers.
Figure 5:
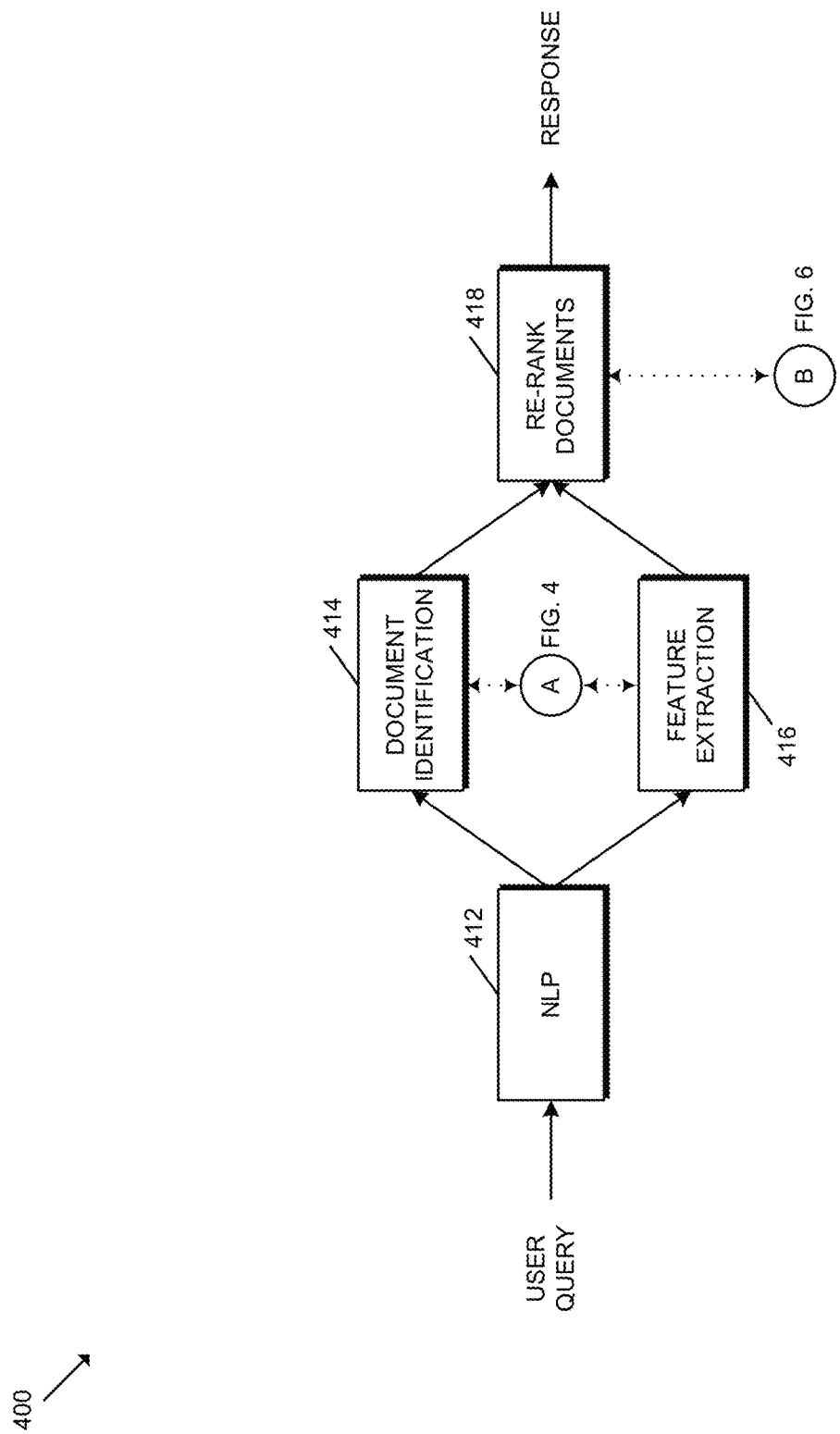
Figure 6:
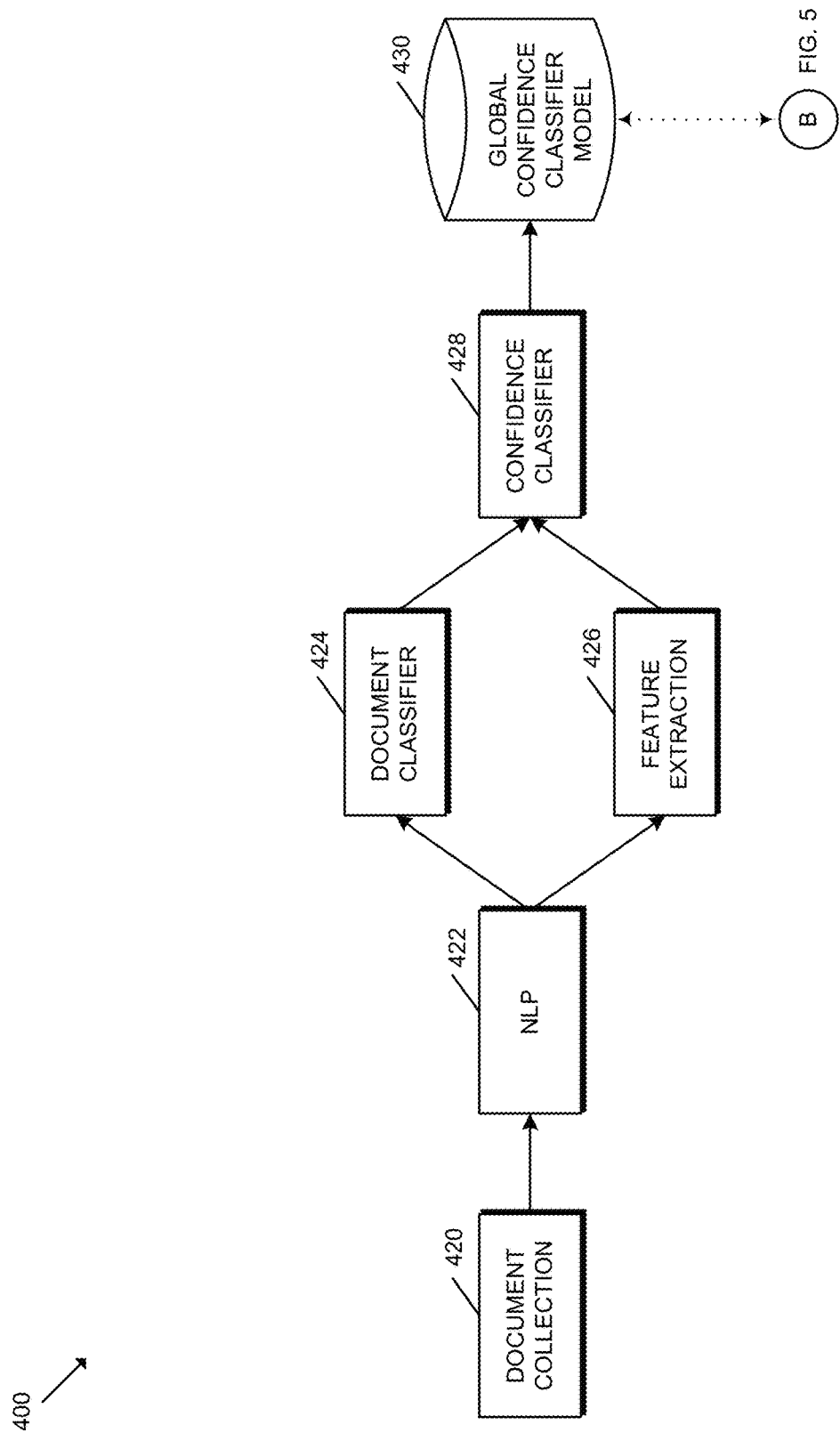

Referring now to FIGS. 4-6, in use, the system 100 or, more specifically, the cloud-based system 102 may execute a system flow 400 for leveraging a global confidence classifier for information retrieval in contact centers. It should be appreciated that the particular blocks of the system flow 400 are illustrated by way of example, and such blocks may be combined or divided, added or removed, and/or reordered in whole or in part depending on the particular embodiment, unless stated to the contrary.

It should be appreciated that the system flow 400 may be described in stages, which are distributed across FIGS. 4-6. Specifically, the portion of the system flow 400 depicted in FIG. 4 may be a training stage, the portion of the system flow 400 depicted in FIG. 5 may be an inference stage, and the portion of the system flow 400 depicted in FIG. 6 may be a global document collection phase. Further, the portion of the system flow 400 depicted in FIGS. 4-5 may be described as the knowledge-only bot framework, and the portion of the system flow 400 depicted in FIG. 6 may be described as the global confidence classifier. In some embodiments, the knowledge-only bot framework may be deployed to multiple organizations.

As shown in FIG. 4, in a document collection phase 402, the system 100 collects organization FAQs, product documents, user manuals, and/or other relevant documentation from a document warehouse or data storage. In some embodiments, one or more of the documents includes questions, answers, alternative questions, similar questions, categories, and/or other related data.

In a natural language processing (NLP) phase 404, the system 100 uses natural language understanding/processing techniques to clean the documents and/or segment the data. It should be appreciated that natural language refers to the way that humans communicate with each other (e.g., speech and text). In some embodiments, NLP may involve the use of statistical methods, machine learning (e.g., deep learning neural networks), and/or other techniques to perform inference on specific tasks and/or for developing robust end-to-end systems. In some embodiments, in the NLP phase 404, the system 100 processes questions, answers, and alternatives of each document, and cleans the data (e.g., by removing unnecessary characters/words, removing stop words, tokenization, word stemming, and/or performing other natural language processing).

In a document classifier phase 406, the system 100 trains a machine learning model to classify the documents. It should be appreciated that a classifier in machine learning is an algorithm that automatically orders or categorizes data into one or more of a set of classes. For example, an email classifier may scan emails to filter them by class label: Spam or Not Spam. In the illustrative embodiment, the machine learning model expects input features (e.g., TF-IDF scores) and targets (e.g., document identifiers). Because latency may be crucial, in some embodiments, the system 100 leverages a linear classifier for learning the association between input features and target document identifiers. In some embodiments, the model may be used to identify a subset of most relevant documents (e.g., the top N elements) with respect to the query. In other embodiments, the document classifier may involve creating a searchable index for all documents based on individual keywords or combinations of words. It should be appreciated that document indexing allows documents to be searched using text contained within (e.g., including full phrases/passages). Full-text indexing may consider the entire content in a document as one piece of text, whereas field-based indexing may involve tagging using metadata (e.g., information about the data itself), which aids in the retrieval of documents based on searching characteristics such as document type, creation data, and/or other document-related parameters.

In a feature extraction phase 408, the system 100 converts clean text into one or more feature vectors (i.e., converting the textual form into a numerical representation). For example, in some embodiments, word embeddings and/or sentence embeddings may be used. It should be appreciated that general and/or custom embeddings may be used depending on the particular embodiment. Custom embeddings may be trained from available documents and may capture organization-specific vocabulary (e.g., reducing out-of-vocabulary issues). There may be an assumption that the numerical representation of the text is similar in higher dimensions. Word embeddings convert each word into a vector representation and average across the utterance to provide a single vector. Sentence embeddings may directly transform the entire utterance into a single vector based on the context. It should be appreciated that machine learning algorithms may learn from a pre-defined set of features from training data to produce output(s) for the test data. However, machine learning algorithms may function more efficiently with matrix/vector representations than with raw text. Accordingly, by converting the text data to a numerical representation, the system 100 can more efficiently and effectively leverage machine learning and artificial intelligence technologies.

It should be appreciated that the results of the document classifier phase 406 and the feature extraction phase 408 may be stored in a data storage 410. For example, the data storage 410 may store models from the document classifier, custom embeddings, confidence classifier data, document indices, and/or other relevant data.

Referring now to FIG. 5, as described above, the system 100 may execute an inference stage in order to draw inferences based on user input. Accordingly, in an NLP phase 412 of FIG. 5, the system 100 may receive a user query to a knowledge-only bot (e.g., "What is the customer care number?") and use natural language understanding/processing techniques to clean the query and/or segment the data in a manner similar to that described in reference to the NLP phase 404 of FIG. 4.

In a document identification phase 414, the system 100 may identify a subset of the most relevant documents (e.g., the top N elements/documents) to the user query. In doing so, in some embodiments, the system 100 may calculate TF-IDF scores for a given query, process the scores through a document classifier, and provide the top N possible documents for the given query. In another embodiment, the system 100 may search through a document indexer.

In a feature extraction phase 416, the system 100 may convert the user input query words into a numerical vector representation (e.g., [0.45623, 0.34544, 0.5565, 0.98098, . . . ]) in a manner similar to that described above in reference to the feature extraction phrase 408 of FIG. 4. It should be appreciated that, during execution of the feature extraction phase 416 and/or the document identification phase 414, the system 100 may retrieve data from and/or update data on the data storage 410 (see FIG. 4).

In a re-rank documents phase 418, the system 100 may re-rank the top N documents based on the input query and output the most relevant response. In some embodiments, the system 100 generates required input features between the given query and possible top N documents and processes the features through the confidence classifier, which outputs probabilities for each class. The system 100 may generate a confidence score between each query and each possible document. The document with the highest score may be identified as the most probable document (e.g., most probable question/answer document). It should be appreciated that the system 100 may leverage and/or update the global confidence classifier model 430 (see FIG. 6) in re-ranking the documents. In other embodiments, a similarity function (e.g., cosine similarity function) may be utilized to generate a similarity score.

Referring now to FIG. 6, as described above, the system 100 may execute a global confidence classifier stage to train a confidence classifier (e.g., the confidence classifier 428) for use with multiple knowledge bases (e.g., for different organizations, different languages, etc.). As described above, in the illustrative embodiment, the global confidence classifier stage involves training a model to predict five-class probabilities based on five numeric input features.

In a document collection phase 420, the system 100 collects organization FAQs, product documents, user manuals, and/or other relevant documentation from a document warehouse or data storage for multiple organizations. It should be appreciated that by relying on knowledge bases from multiple different organizations, the system 100 gains access to a larger number of documents, alternatives, categories, etc. In a NLP phase 422, the system 100 may use natural language understanding/processing techniques to clean the documents and/or segment the data in a manner similar to that described in reference to the NLP phase 404 of FIG. 4.

In a document classifier phase 424, the system 100 may train a machine learning model to classify the documents in a manner similar to that described in reference to the document classifier phase 406 of FIG. 4. In a feature extraction phase 426, the system 100 may covert clean text into one or more feature vectors (i.e., converting the textual form into a numerical representation) in a manner similar to that described in reference to the feature extraction phase 408 of FIG. 4.

In a confidence classifier phase 428, the system 100 measures the confidence in each document (e.g., of the top N documents). It should be appreciated that a confidence classifier is useful when dealing with more than two classes in the classifier, and the confidence classifier assesses the confidence in a particular class for the particular query. For example, when performing weather classification (e.g., summer, winter, autumn, spring), given the weather condition, the confidence classifier may estimate how confident the weather condition corresponds with the various classes. In the illustrative embodiment, the confidence classifier is trained as a five-class problem that uses five input features.

The input features may include a first alignment score, a second alignment score, a similarity score, a document score, and a word overlap score. The first alignment score (F0) may be a word alignment score between the user query and document, and the score may be calculated according to:

$$D = \{D_0, D_1, D_2, D_3, \ldots, D_N\} \quad \text{(Equation 1)}$$

$$C = \alpha(QD_i^T) + \beta \quad \text{(Equation 2)}$$

-continued $$S = \text{Argmax}(C, \text{axis} = 1) \quad \text{(Equation 3)}$$

$$F0 = \frac{\sum_{i=0}^{n}(S_i * I_i)}{\sum_{i=0}^{n} I_i} \quad \text{(Equation 4)}$$

wherein D is a set of documents that are identified by the document classifier for a given query, α and β are tunable parameters, Q is a matrix of word embedding vectors for each word in the query, $D_i$ is a matrix of word embedding vectors for each word in the document, C is a similarity matrix between query words and document words, S is the maximum values for each word in the query, I is the IDF scores for each word in the query, and F0 is the first alignment score of the dot product of similarity scores and IDF scores normalized with the IDF scores.

The second alignment score (F1) is calculated using the Equations 1-4 for calculating the first alignment score (F0) but swapping the query and document word vectors. It should be appreciated that the second alignment score provides how similar the document is with respect to the query. The similarity score between the query and the document is calculated using cosine similarity on average word embedding vectors of the query and document. The document score is calculated from the document classifier, whereby each document predicted by the document classifier is also given a score for the document.

The word overlap score (OS) calculates how many n-grams are similar between the query and the document (e.g., in this context, bi-grams). The word overlap score (OS) is calculated according to:

$$WQ = [(w_1, w_2), (w_2, w_3), \ldots, (w_{N-1}, w_N)] \quad \text{(Equation 5)}$$

$$WD_i = [(w_1, w_2), (w_2, w_3), \ldots, (w_{N-1}, w_N)] \quad \text{(Equation 6)}$$

$$O = WQ \& WD_i \quad \text{(Equation 7)}$$

$$OS = \frac{2}{\frac{\|WQ\|}{O} + \frac{\|WD_i\|}{O}} \quad \text{(Equation 8)}$$

wherein W Q is bigrams for a given query, $WD_i$ is bigrams for each possible document, O gives how many bigrams are overlapping between the query and possible document, and OS gives the overall word overlap score.

As indicated above, the illustrative confidence classifier has five classes. For a first class, the expected document identifier for the given query is not matching with the predicted document identifier with a very low score (e.g., satisfied due to poor input provided). For a second class, the expected identifier for the given query is not matching with the predicted document identifier with a moderate score. For a third class, the expected document identifier for the given query is not matching with the predicted document identifier, but the category of the predicted document is the same with respect to the expected document identifier category. The document is surfaced at the third or fourth position. For a fourth class, the expected document identifier for the given query is not matching with the predicted document identifier, but the category of the predicted document is the same with respect to the expected document identifier category. The document is surfaced at the first or second position. For a fifth class, the expected document identifier for the given query is the same as the predicted document identifier.

It should be appreciated that the results of the confidence classifier 428 may be used to further update or train the global confidence classifier model 430. Additionally, as depicted, the global confidence classifier model 430 may be leveraged by the re-rank documents phase 418 (see FIG. 5).

As shown in the table of FIGS. 7-8, the global classifier yields improved results relative to traditional approaches to classification using knowledge-only bots, in terms of both speed/duration of execution and accuracy of the approach. The table illustrates four different variations of knowledge base types and the corresponding data: knowledge bases with categories and alternatives, knowledge bases with categories but no alternatives, knowledge bases with alternatives but no categories, and knowledge bases with neither alternatives nor categories. The table also illustrates the results of knowledge bases of different sizes (i.e., 10 documents, 20 documents, 50 documents, 80 documents, 100 documents, and a "full" database having greater than 100 documents) and different languages (i.e., English and German). As shown, the global confidence classifier according to the techniques described herein yielded improved results across nearly every data set.

What is claimed is:

1. A method of leveraging a global confidence classifier for information retrieval of knowledge-only bots in contact centers, the method comprising:
   receiving, by a computing system, a user query from a contact center client's communication with a knowledge-only bot of the computing system;
   performing, by the computing system, feature extraction on the user query by converting query words of the user query into a numerical vector representation of the user query;
   identifying, by the computing system using a document classifier machine learning model, a subset of documents most likely to be responsive to the user query; and
   re-ranking, by the computing system using a global confidence classifier machine learning model, the subset of documents identified to be most likely to be responsive to the user query based on the document classifier machine learning model;
   wherein the global confidence classifier machine learning model is trained based on a confidence classifier that uses at least an alignment score, a similarity score, a document score, and a word overlap score;
   wherein the alignment score is determined based on the subset of documents, a matrix of word embedding vectors for each word in the user query, and a similarity matrix between words in the user query and words in the subset of documents;
   wherein the similarity score is a cosine similarity on average word embedding vectors of a respective document of the subset of documents and the user query;
   wherein the document score is a score generated by the document classifier machine learning model; and
   wherein the word overlap score is indicative of a number of n-grams that are similar between the user query and the respective document of the subset of documents.

2. The method of claim 1, further comprising providing, by the computing system, a response to the contact center client based on the re-ranked subset of documents via the knowledge-only bot in response to re-ranking the subset of documents identified to be most likely to be responsive to the user query.

3. The method of claim 1, wherein the global confidence classifier machine learning model is trained based on document sets for a plurality of organizations.

4. The method of claim 3, wherein the global confidence classifier machine learning model is trained based on document sets in a plurality of human languages.

5. The method of claim 1, wherein the global confidence classifier machine learning model is trained based on a confidence classifier that uses at least five input features.

6. A method of leveraging a global confidence classifier for information retrieval of knowledge-only bots in contact centers, the method comprising:
receiving, by a computing system, a user query from a contact center client communication with a knowledge-only bot of the computing system;
performing, by the computing system, feature extraction on the user query by converting query words of the user query into a numerical vector representation of the user query;
identifying, by the computing system, a subset of documents most likely to be responsive to the user query using a first classifier machine learning model; and
re-ranking, by the computing system using a global confidence classifier machine learning model, the subset of documents identified to be most likely to be responsive to the user query based on the first classifier machine learning model;
wherein the global confidence classifier machine learning model is trained based on a confidence classifier that uses at least five input features; and
wherein the at least five input features comprise a first alignment score between the user query and a corresponding document, a second alignment score between the corresponding document and the user query, a cosine similarity score between the user query and the corresponding document, a document score from a document classifier, and a word overlap score that calculates a number of n-grams that are similar between the user query and the corresponding document.

7. The method of claim 1, wherein performing the feature extraction on the user query comprises performing the feature extraction on the user query using custom embeddings.

8. The method of claim 1, further comprising natural language processing, by the computing system, the user query to generate processed data, wherein the natural language processing comprises at least one of cleaning or segmenting data of the user query.

9. A system for leveraging a global confidence classifier for information retrieval of knowledge-only bots in contact centers, the system comprising:
at least one processor; and
at least one memory comprising a plurality of instructions stored thereon that, in response to execution by the at least one processor, causes the system to:
receive a user query from a contact center client communicating with a knowledge-only bot of the system;
perform feature extraction on the user query by converting query words of the user query into a numerical vector representation of the user query;
identify, using a document classifier machine learning model, a subset of documents most likely to be responsive to the user query;
re-rank, using a global confidence classifier machine learning model, the subset of documents identified to be most likely to be responsive to the user query based on the feature extraction and the document classifier machine learning model;
wherein the global confidence classifier machine learning model is trained based on a confidence classifier that uses at least five input features; and
wherein the at least five input features comprise a first alignment score between the user query and a corresponding document, a second alignment score between the corresponding document and the user query, a cosine similarity score between the user query and the corresponding document, a document score from a document classifier, and a word overlap score that calculates a number of n-grams that are similar between the user query and the corresponding document.

10. The system of claim 9, wherein the plurality of instructions further causes the system to provide a response to the contact center client based on the re-ranked subset of documents via the knowledge-only bot in response to re-ranking the subset of documents identified to be most likely to be responsive to the user query.

11. The system of claim 9, wherein the global confidence classifier machine learning model is trained based on document sets for a plurality of organizations in a plurality of human languages.

12. The system of claim 9, wherein to perform the feature extraction on the user query comprises to perform the feature extraction on the user query using custom embeddings.

13. The system of claim 9, wherein the plurality of instructions further causes the system to apply natural language processing to the user query to generate processed data, wherein the natural language processing comprises at least one of cleaning or segmenting data of the user query;
wherein to perform the feature extraction on the user query comprises perform feature extraction on the processed data; and
wherein to identify the subset of documents most likely to be responsive to the user query comprises to identify the subset of documents based on the processed data.

14. The method of claim 1, wherein the document classifier machine learning model comprises a linear document classifier model.

15. The method of claim 1, wherein identifying the subset of documents most likely to be responsive to the user query comprises calculating term frequency-inverse document frequency (TF-IDF) scores for the user query.

16. The method of claim 1, wherein re-ranking the subset of documents identified to be most likely to be responsive to the user query based on the document classifier machine learning model comprises generating a confidence score between the user query and each possible document.

17. The method of claim 1, wherein the knowledge-only bot retrieves data from at least one knowledge base; and
wherein the global confidence classifier machine learning model is trained based on a plurality of knowledge bases including another knowledge base different from the at least one knowledge base.

18. The method of claim 1, wherein the alignment score is indicative of a similarity of the respective document of the subset of documents to the user query.

* * * * *